April 17, 1951     H. R. KEMMERER     2,549,377
TORQUE CONVERTER FLUIDS
Filed Oct. 4, 1949
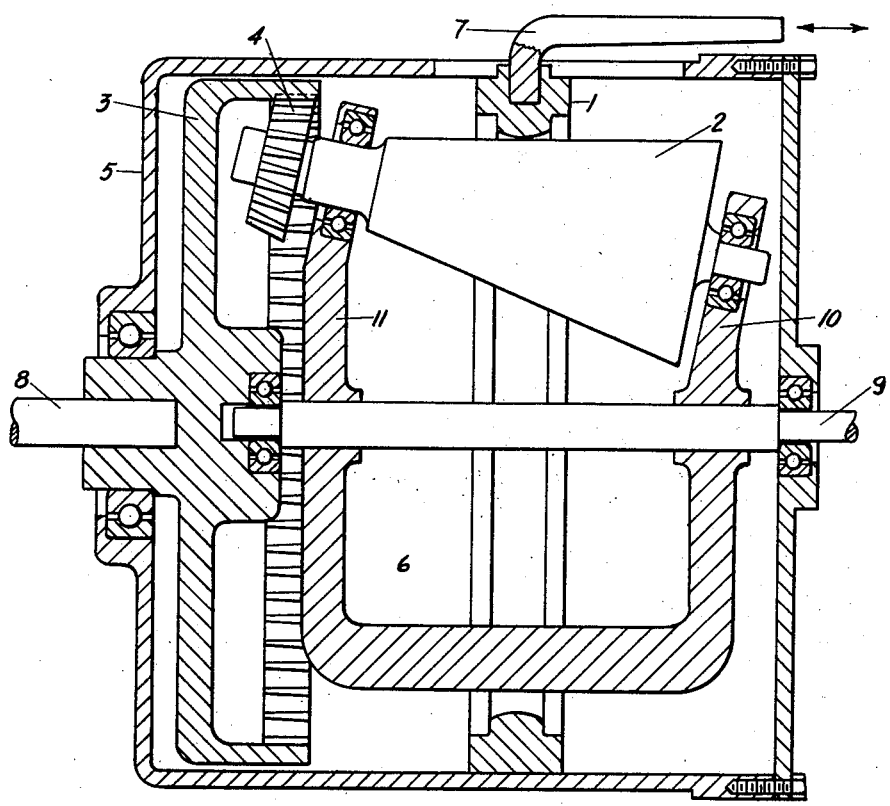
Inventor: Harold R. Kemmerer
By: James Todorovic
His Attorney Patented Apr. 17, 1951

2,549,377

UNITED STATES PATENT OFFICE 2,549,377

TORQUE CONVERTER FLUIDS

Harold R. Kemmerer, Alton, Ill., assignor to Shell Development Company, San Francisco, Calif., a corporation of Delaware Application October 4, 1949, Serial No. 119,429

9 Claims. (Cl. 252—49.8)

This invention relates to torque converter fluids. More particularly, this invention is concerned with compositions especially designed for use in friction drive torque converters at low temperatures.

Friction gears depend for their driving action on the friction upon the driving wheel, or driver, against its mate or follower. Friction gears are used ordinarily for light and medium power in machinery which may be frequently started and stopped. Also, such gears are employed where provision for a change of speed of the driving shaft or a reversed motion is necessary. A recent application of torque converter mechanisms comprises their use in aircraft cabin superchargers. For this latter purpose, a fluid capable of operating under a wide variety of temperatures is essential, and it is especially important that the fluid be operable at the low temperatures encountered at high elevations.

The usual disadvantages of friction gears are the thrust on the bearings and more especially, slippage. These factors result in a comparatively low efficiency of the apparatus unless they are corrected. The driving capacity of friction gears is a function of the coefficient of friction between the surfaces in contact and of the pressure which holds them in contact.

One of the limiting features of friction gears up to the present time has been the unsatisfactory performance of mineral oil, or of fluids containing the same, for the purposes of lubrication and prevention of wear. In the act of lubricating or preventing wear, a film of oil between the friction gear surfaces usually results in an increased slippage between the contact points of the surfaces of the engaging gears. The per cent of slip increases drastically and even prohibitively with power input when ordinary high viscosity index mineral lubricating oils are employed. Even at low speeds and with low loads, mineral lubricating oils containing only a few per cent of additives designed to increase the coefficient of friction exhibit slippage which prevents their use where high efficiencies are required.

The essential qualifications of a friction gear transmission fluid comprise especially a high coefficient of friction (which ordinary lubricants do not possess) and an extremely high thermal stability and resistance to oxidation so as to minimize the necessity for fluid replacement. Another property which the subject fluids must exhibit is minimum sludging characteristics. Furthermore, bearings and gears in the same mechanism containing the friction gear assembly must be lubricated simultaneously. As intimated above, an additional important requirement when aircraft use is contemplated comprises the ability of the fluid to perform its function over a wide range of temperatures.

A copending application by Samuel K. Talley and Forrest J. Watson, Serial No. 56,446, filed October 25, 1948, discloses the use of a particular fraction of tertiary alkylated naphthalenes as a torque converter fluid. While mixtures of tertiary alklated naphthalenes are outstanding in their performance for this purpose at ordinary temperatures, they possess viscosity indexes of between —50 to —400. This physical characteristic results inevitably in undue thickening or even solidification of the lubricants when low temperatures are present. Hence, while this particular fluid is highly satisfactory for ordinary applications, such as automotive uses and machine tool assemblies, it exhibits a definite limitation when aircraft use is desired.

It is an object of this invention to provide a torque converter fluid exhibiting substantially the same remarkable performance in friction gear transmission as the tertiary alkylated naphthalenes referred to above. It is another object of this invention to provide a torque converter assembly suitable for use at low temperatures or for aircraft purposes. Other objects will become apparent in the following discussion.

Now, in accordance with the present invention, it has been found that the low temperature properties of tertiary alkylated naphthalenes may be greatly improved without detrimentally affecting their outstanding effect for the lubrication of friction gear mechanisms. In accordance with this invention, the pour point of tertiary alkylated naphthalenes may be lowered as much as 75° F. by the inclusion of a mineral lubricating oil without detrimentally affecting their outstanding effect at low speed-high load conditions, as long as said oil contains a minor proportion of an aryl phosphate ester. More particularly, the composition comprising the present invention contains tertiary alkylated naphthalenes having 1 to 4 alkyl groups per naphthalene nucleus, each of said groups having from 4 to 12 carbon atoms and 90% of said alkylated naphthalenes boiling between 200 and 500° C. at atmospheric pressure; a mineral lubricating oil in an amount between one-third to three parts by weight per part of alkylated naphthalenes and 1 to 10% by weight of the mineral oil of an aryl phosphate ester.

The alkylated naphthalenes

It is known that the alkylation of naphthalenes can produce highly viscous oils. This alkylation may be carried out by reacting olefins or alkyl halides with naphthalenes in the presence of a suitable Friedel-Crafts catalyst. Such materials have been used for various purposes, such as the impregnation of cable oil wrappings. However, the previously-employed compositions were either composed of a mixture of alkylated naphthalenes, including primary and secondary naphthalenes, or, in the specific use mentioned, they comprised highly viscous or semi-solid tertiary alkylated naphthalenes, preferably having viscosity indices of −1000 or even lower. In the present instance, as will be discussed fully hereinafter, outstanding results have been obtained with the use of tertiary alkylated naphthalenes having the properties described above. The heavier fractions which are suitable for cable oil purposes could not be used effectively for friction drive transmission fluids primarily due to their high pour points and correspondingly high viscosities.

The tertiary alkyl naphthalenes useful in the present invention can be produced by reacting, under known conditions, naphthalene with tertiary base olefins. Suitable olefins or their substitutes include, especially, those having from 4 to 12 carbon atoms, such as propylene dimer, trimer or tetramer, isobutylene, diisobutylene, triisobutylene, isoamylene, the so-called "hot-acid octylenes" produced by polymerizing isobutylenes with sulfuric acid, e. g., at about 70° C., tertiary alkyl chlorides, tertiary alcohols, etc. The ratio of alkyl groups to the naphhtalene rings in the reaction product should be from 1:1 to 4:1 and preferably from 2:1 to 4:1.

To avoid excessive polymerization of olefins, if olefins are used for the alkylation of the naphthalene, it is desirable to add the latter to the mixture continuously or intermittently as the reaction proceeds. The temperature of reaction is preferably maintained between about 0° and 150° C., depending upon the alkylating agent used. When aluminum chloride is the catalyst, operating temperatures within the range of 35° to 75° C., or preferably 40° to 60° C., give a product having optimum properties. The amount of Friedel-Crafts catalyst employed is advantageously within the range of about 4 to 6%, by weight of the naphthalene, although quantities from about 1% to about 15% may be used. Other alkylation catalysts, such as sulfuric or sulfonic acids, may also be employed if desired.

The oils produced in the reaction described above comprise mixtures of small amounts of polymerized olefins, unreacted naphthalene and various alkyl naphthalenes containing different numbers of tertiary alkyl side chains. These oils are subjected to fractionation, preferably under reduced pressure. In order to produce an oil suitable as a fluid in friction-gear transmissions, the fraction boiling below 200° C. at atmospheric pressure is removed. The remaining "bottoms" may be used without further treatment, or they may be further fractionated to obtain particularly suitable lubricants. In order to obtain a lubricant for the present purpose, the conditions of polymerization and distillation should be adjusted so that at least 90% of the product to be used in the friction drive mechanism boils within the range of from about 200° C. to about 500° C., at atmospheric pressure, preferably 250° to 400° C. Hence, if the alkylation process has resulted in the production of substantial amounts of highly substituted alkylenes having a boiling point over 500° C., a "heart cut" should be taken, eliminating the fraction boiling below 200° C. and also a large proportion of the fractions boiling above 500° C.

The fraction boiling within the above-specified range has an average viscosity index (Dean and Davis) which should vary between −50 and −400, an average viscosity index of −100 to −200 being preferred. At ordinary room temperature, the viscosity of this fraction resembles very light lubricating oil, having an S. A. E. number of less than 10.

The oils having the above properties, which oils are to be used for friction drive lubrication, are believed to consist predominantly of a mixture of normally fluid mono-tertiary alkyl naphthalenes, normally crystalline ditertiary alkyl naphthalenes and a minor amount of tertiary alkyl naphthalenes of higher degrees of substitution. Various minor quantities of by-products of the reaction also may be present. If unreacted naphhtalene remains in the product, no adverse effect is apparent if the quantity is below about 5 to 10%, by weight, and its presence actually appears to improve oxidation stability. A small proportion of polymerized olefins also may be present in the fluid. In lieu of the mixture of the aforementioned alkylated naphthalenes, the individual naphthalenes may also be used, provided they possess the aforementioned properties.

One of the outstanding properties of the oils described is their high oxidation stability in relation to primary or secondary alkyl naphthalenes and especially in relation to ordinary mineral oils. Under comparable conditions, the tertiary alkylated naphthalenes described will last for at least five times as long as a mineral oil of similar viscosity.

Mineral oil

The petroleum lubricating oils suitable for use in the compositions of the present invention comprise especially those having viscosity characteristics approximately 30–100 seconds Saybolt Universal viscosity at 100° F. and a viscosity index between about 30 and 80. Preferably, for use in sealed systems, such as the compartments in closed friction drive mechanisms, a highly refined oil is employed.

Transformer oils have been found to be especially suitable, particularly when they have a viscosity of 40–75 seconds at 100° F. Transformer oils ordinarily are distillate oils refined in such a manner as to secure the specified characteristics of freedom from slippage and corrosion to as great an extent as possible. The production of transformer oil such as those especially suitable in the present compositions is effected by well-known processes. The useful transformer oils ordinarily comprise highly refined petroleum distillates. Acid refined or solvent refined oils may be employed and in some instances it is desirable to employ oils which have been subjected both to acid refining and solvent refining.

While transformer oils are the preferred type of mineral lubricating oil, other lubricants derived from mineral oils may be employed. The mineral oil fraction of the compositions described may be stabilized against oxidation, corrosion, sludging and other adverse characteristics by the inclusion of well-known additives for these particular purposes.

Phosphorus esters

The addition of unmodified mineral oils to tertiary alkylated naphthalenes results in compositions having unsatisfactory properties for use as friction drive fluids. While the addition of the mineral oil lowers the pour point of the composition, slippage increases prohibitively and results in a composition which is usually undesirable for the subject purpose. It has been found that the mixture of tertiary alkylated naphthalenes and mineral oil may be modified by the inclusion of an aryl phosphate ester to give a composition having not only the greatly improved pour point characteristics imparted by the mineral oil, but also substantially the same low slippage characteristics mainly attributable to the alkylated naphthalenes. This property is especially useful under conditions where low torque loads are utilized.

The term "ester" is understood to include mono-, di- and triesters of phosphorous acids wherein the esterifying radical is an aryl group. Preferably, triesters are employed and still more preferably, the aromatic ester groups comprise alkylated phenyl groups. The phosphorus acids from which the esters may be prepared comprise phosphoric acid, phosphonic acid, phosphinic acid and phosphorous acid. Typical species include tricresyl phosphate, triphenyl phosphate and triphenyl phosphite.

Tricresyl phosphates prepared by the reaction of a phosphorus acid with the mixture of cresols obtained from petroleum sources have been found to be especially effective in the compositions of this invention. The term "tricresyl phosphate" is, therefore, meant to include especially a mixed product containing the triesters of ortho-, meta and para-cresols with phosphoric acid. The methods of preparing these esters, such as by reaction of the aromatic alcohols with an acid chloride, are too well-known to require description.

The presence of sulfur or sulfur compounds in friction drive lubricants has been found to materially increase the degree of slippage under high operating loads. For this reason the triesters of phosphorus acids are undesirable and sulfur containing phosphorus compounds are not to be included within the term "aromatic esters of phosphorus acids." The similar action of chlorinated compounds with regard to slippage under high loads also prohibits their use in friction drive lubricants if the mechanism is to be operated under high loads.

Additional ingredients

Since friction drive mechanisms are generally contained in sealed units, it is especially desirable that the fluid has maximum stability characteristics against oxidation, heating and other adverse influences. In order to improve the oxidation susceptibility of the mineral oil fraction, it is, therefore, desirable (although not essential) that an oxidation inhibitor for mineral oil be included in an amount between 0.1 and 10% by weight of said oil. In the present instance, it has been found that tertiary alkylated phenols are especially suitable and impart no adverse properties to the composition. The phenols found to be especially effective for this purpose comprise tertiary alkylated monohydroxy phenols, especially when they contain more than one tertiary alkyl substituent.

The preferred class of phenols are the 2,4,6-trialkylated monohydroxy phenols having 4 or more carbon atoms in at least one alkyl group ortho to the hydroxyl group, said alkylated phenol being substantially insoluble in water and in dilute aqueous alkali. The most effective species of this class is 2,6-ditertiary-butyl-para-cresol. The corresponding amyl phenols may be employed for the same purpose such as 2,6-ditertiary-amyl-para-cresol. Xylol derivatives may be used as well, the ethyl substituent preferably replacing the methyl group present in the two cresols named above. Other phenols which are suitable for the purpose include 2,6-ditertiary-butyl-4-tertiary-amyl-phenol. The preparation of phenols, such as those described above, may be conducted by methods well-known in the art.

Compositions containing alkylated napthalenes have been found to be especially responsive to the presence of rust inhibitors, particularly of the class of higher aliphatic dicarboxylic acids. These acids should have at least 16 carbon atoms, and include alkyl malonic acids, e. g., cetyl malonic acid, alkyl succinic acids such as octadecenyl succinic acids, alkylated sebacic acids and others, such as those described in U. S. Patent 2,398,485.

It has been found that the use of as little as 0.005% to as much as 1.0% by weight of the acids, based on the alkylated naphthalenes, provides optimum rust inhibition.

The accompanying diagram in Fig. I represents a sectional view of a typical ring and cone type of friction gear mechanism in which the present fluids may be used. The shaft 9 rotates and causes face plates 10 and 11 to rotate carrying the cone 2 (1 of 3 or more) around the common axis of shafts 8 and 9. The cone 2 rotates on its own axis against the ring 1. The ring 1 whose position is regulated by the shaft 7 constitutes the regulating member for the cone 2. The position of the ring with relation to the cone determines the speed with which the latter turns. The cone is connected with a gear 4 which travels in a ring-gear 3 to form a planetary gear set 3 and 4. This gear is the rotating member which activates the shaft 8. The compositions of the present invention are present in the space 6 and constitute the lubricant and fluid especially at the contact point of the ring and cone as well as for the contact points of the two gears and for the shafts at the point where they pass through the transmission casing 5.

The above description pertains to one particular embodiment of a ring and cone friction drive. Other types of friction gears with which the subject composition may be used include spur friction gears, bevel friction gears and disc friction gears, as well as combinations and variations thereof. The particular fluids described are also suitable for the lubrication of friction clutches of either the axial or rim type. The clutches also require a lubricant having a high coefficient of friction under high load such as that possessed by the compositions forming the present invention.

In combining the three essential ingredients of the present compositions, so as to provide good low temperature properties and at the same time maintain a satisfactory coefficient of friction and other properties suitable for friction gear lubrication, it is necessary to restrict the ratios of the ingredients as follows: The mixture of tertiary alkylated naphthalenes and mineral lubricating oil each should be present in amounts varying between 25 and 75 parts by weight. In other terms, the amount of mineral oil may vary between one-third to three parts by weight of the alkylated naphthalenes. In addition, the aryl phosphate ester should be present in an amount between 1 and 10% by weight of the mineral lubricating oil; preferably this amount is between 1 and 4% by weight of the total composition. In order to maintain high oxidation resistance, the tertiary alkylated phenols described above may be present in an amount between 0.1 and 10% by weight of the oil or preferably 0.1 to 4% by weight of the total composition. In order to obtain maximum operating efficiency, it is preferred that the composition contain between 40 and 60% by weight each of the alkylated naphthalenes and of the mineral lubricating oil. The following example describes a typical preparation of an alkylated naphthalene useful for use in the present compositions.

Equimolecular amounts of naphthalene and diisobutylene were reacted with 6% of aluminum chloride (based on the naphthalene) within the temperature range 40° C. to 65° C. The naphthalene was suspended as a slurry in a mixture of hexanes. The diisobutylene was gradually added together with the aluminum chloride at such a rate as to maintain a temperature below about 65° C. The reaction mixture was modified by the addition of dry HCl gas to activate the catalyst. The sludge was withdrawn at the end of the reaction period, and the oily layer remaining was caustic washed. Under reduced pressure, the lowest boiling constituents, which were principally water, hexanes, lower olefin polymers and some naphthalene, were removed to a top temperature corresponding to 200° C. at atmospheric pressure.

The product had a viscosity of 40 centistokes at 100° F. and a viscosity index of −110. The boiling range of 93% of the resulting product was 260° C. to 460° C.

In demonstrating the effectiveness of the present invention, the following tests were performed: A mixture of tertiary alkylated naphthalenes prepared as described above was found to have a pour point of +10° F. When this mixture was employed as the fluid in a friction drive apparatus, such as that described herein, it was found to permit an increase of 63.3% above the rated torque at top speed and 45.0% at one-tenth of top speed. A fluid having the pour point described is useless for aircraft purposes since it solidifies at a point only slightly below ordinary room temperature. Therefore, a mixture of transformer oil with an equal amount of the same alkylated naphthalenes can be made to reduce the pour point. However, such a mixture shows excessive slippage and cannot be used as a torque converter fluid. When a transformer oil containing 0.3% 2,6-ditertiary-butyl-paracresol and 3% tricresyl phosphate was diluted with an equal amount of tertiary alkylated naphthalenes described above, the resulting composition had a pour point of −50° F. and permitted the same friction drive apparatus to be operated at 50% above the rated torque at top speed and 45% above the rated torque at one-tenth of top speed. The use of 3 parts of transformer oil to 1 part of the alkylated naphthalenes or conversely the use of 1 part of transformer oil to 3 parts of alkylated naphthalenes did not appreciably change these figures as long as tricresyl phosphate was present in the composition.

I claim as my invention:

1. A friction gear lubricant comprising 40 to 60% by weight of tertiary butylated naphthalenes bearing an average of 1 to 4 butyl substituents per naphthalene nucleus, an average viscosity index of −50 to −400 and at least 90% of said butylated naphthalenes boiling within the range 200° C. to 500° C. at 760 mm. mercury pressure, 60 to 40% by weight of mineral transformer oil, 1 to 4% by weight of tricresyl phosphates and 0.1 to 4% by weight of 2,6-ditertiary-butyl-para-cresol.

2. A friction gear lubricant comprising 25 to 75 parts by weight of a mixture of tertiary butyl naphthalenes having an average of 1 to 4 butyl substituents per naphthalene nucleus, an average viscosity index of −50 to −400 and at least 90% of said butylated naphthalenes boiling within the range 200° C. to 500° C. at 760 mm. mercury pressure, 75 to 25 parts by weight of a mineral transformer oil, 1 to 10% by weight of said oil of tricresyl phosphate and 0.1 to 10% by weight of said oil of 2,6-ditertiary-butyl-para-cresol.

3. A friction gear lubricant comprising 25 to 75 parts by weight of a mixture of tertiary butyl naphthalenes having an average of 1 to 4 butyl substituents per naphthalene nucleus, an average viscosity index of −50 to −400 and at least 90% of said butylated naphthalens boiling within the range 200° C. to 500° C. at 760 mm. mercury pressure, 75 to 25 parts by weight of a mineral transformer oil, 1 to 10% by weight of said oil of a triaryl phosphate ester and 0.1 to 10% by weight of said oil of a tertiary alkylated monohydrixy phenol.

4. A friction gear lubricant comprising 25 to 75 parts by weight of a mixture of tertiary butyl naphthalenes having an average of 1 to 4 butyl substituents per naphthalene nucleus, an average viscosity index of −50 to −400 and at least 90% of said butylated naphthalenes boiling within the range 200° C. to 500° C. at 760 mm. mercury pressure, 75 to 25 parts by weight of a mineral lubricating oil having a Saybolt Universal Viscosity at 100° F. of 30–100 seconds and 1 to 10% by weight of said oil of tricresyl phosphate.

5. A friction gear lubricant comprising 25 to 75 parts by weight of a mixture of tertiary butyl naphthalenes having an average of 1 to 4 butyl substituents per naphthalene nucleus, an average viscosity index of −50 to −400 and at least 90% of said butylated naphthalenes boiling within the range 200° C. to 500° C. at 760 mm. mercury pressure, 75 to 25 parts by weight of a mineral lubricating oil having a Saybolt Universal Viscosity at 100° F. of 30–100 seconds and 1 to 10% by weight of said oil of a triaryl phosphate ester.

6. A friction gear lubricant comprising 25 to 75 parts by weight of a mixture of tertiary butyl naphthalenes having an average of 1 to 4 butyl substituents per naphthalene nucleus, an average viscosity index of −50 to −400 and at least 90% of said butylated naphthalenes boiling within the range 200° C. to 500° C. at 760 mm. mercury pressure, 75 to 25 parts by weight of a mineral transformer oil and 1 to 10% by weight of said oil of triphenyl phosphate.

7. A friction gear lubricant comprising tertiary alkylated naphthalenes, mineral lubricating oil having a Saybolt Universal Viscosity at 100° F. of 30–100 seconds and a triaryl phosphate ester, said alkylated naphthalenes having an average alkyl substitution from 1 to 4, each of the tertiary alkyl substituents having from 4 to 12 carbon atoms, an average viscosity index of −50 to −400 and at least 90% of said alkylated naphthalenes boiling within the range 200° C. to 500° C. at 760 mm. mercury pressure, said mineral oil being present in an amount between one-third to three parts by weight per part of alkylated naphthalenes, and said phosphate ester being an aryl phosphate ester present in an amount between 1% and 10% by weight of the mineral oil.

8. A lubricant according to claim 7 wherein the alkylated naphthalenes are tertiary amyl naphthalenes.

9. A friction gear lubricant comprising in addition to alkylated naphthalenes, lubricating oil and a phosphate ester according to claim 7 and in addition thereto higher aliphatic dicarboxylic acid having at least 16 carbon atoms in an amount between 0.005% and 1% by weight of the alkylated naphthalenes.

HAROLD R. KEMMERER.

REFERENCES CITED

The following references are of record in the file of this patent:

UNITED STATES PATENTS

| Number | Name | Date |
|---|---|---|
| 2,203,102 | Powers | June 4, 1940 |
| 2,237,336 | Caprio | Apr. 8, 1941 |
| 2,241,531 | Wiezevich | May 13, 1941 |
| 2,355,993 | Morgan | Aug. 15, 1944 |
| 2,395,380 | Morgan | Feb. 19, 1946 |
| 2,436,110 | Larsen | Feb. 17, 1948 |